Sept. 22, 1959     J. M. KING     2,904,933
FLORISTS' ACCESSORIES
Filed Jan. 6, 1958     2 Sheets-Sheet 1
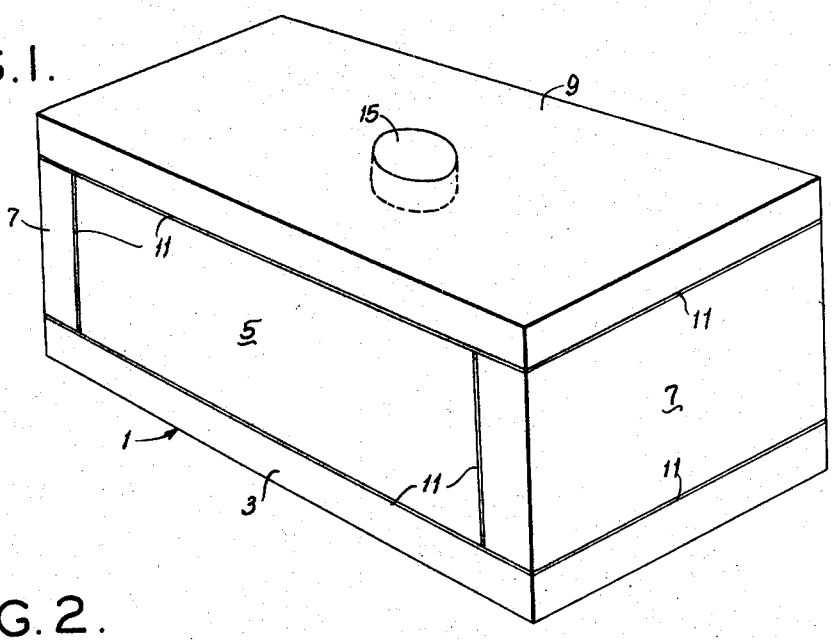
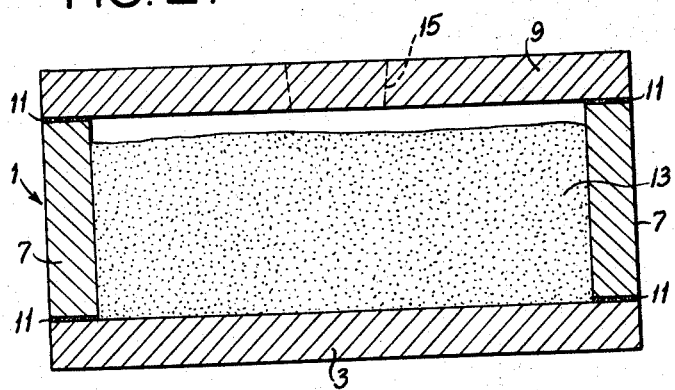
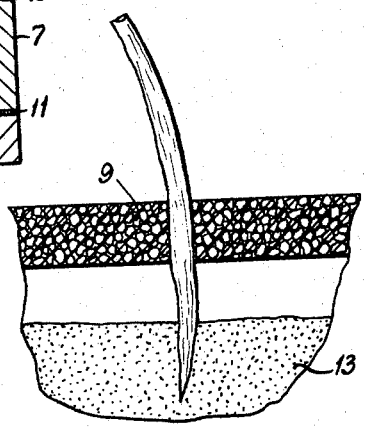
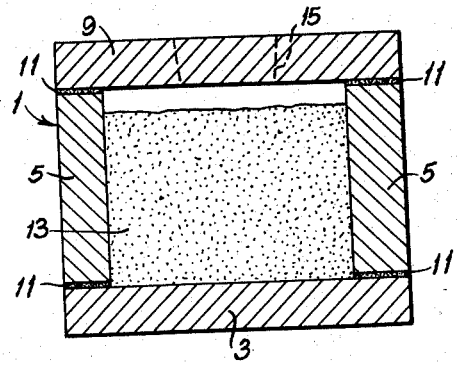
James M. King,
Inventor.
Koenig and Pope,
Attorneys.

Sept. 22, 1959    J. M. KING    2,904,933
FLORISTS' ACCESSORIES

Filed Jan. 6, 1958    2 Sheets-Sheet 2

James M. King,
Inventor.
Koenig and Pope,
Attorneys.

2,904,933
Patented Sept. 22, 1959

2,904,933
FLORISTS' ACCESSORIES
James M. King, Denver, Colo.

Application January 6, 1958, Serial No. 707,438

7 Claims. (Cl. 47—41)

This invention relates to florists' accessories, and more particularly to accessories for use by florists in making up floral arrangements such as so-called floral sprays, designs, table center-pieces, plaques and special forms.

This application is a continuation-in-part of my co-pending applications Serial No. 316,711, filed October 24, 1952 for Flower Holder, now abandoned, and Serial No. 524,222, filed July 25, 1955, now abandoned, for Florists' Accessories.

Among the several objects of the invention may be noted the provision of means for holding cut flowers, and decorative accessories if desired, precisely as initially positioned in desired ornamental arrangements which provide both a base for receiving and holding the stems of the flowers, thereby firmly holding the flowers in the desired arrangement, and means for supplying moisture to the flowers to keep them fresh for a considerable period; the provision of means of the class described which securely hold the flowers from falling out or becoming disarranged even under rough handling; and the provision of means of the class described which provide moisture (and nutriment, if desired) for the flowers without any leakage. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which several of various possible embodiments of the invention are illustrated, Fig. 1 is a perspective illustrating a flower holder of this invention;

Fig. 2 is a longitudinal cross section of Fig. 1;

Fig. 3 is a transverse cross section of Fig. 1;

Fig. 4 is an enlarged fragmentary cross section showing how a flower stem is inserted;

Corresponding reference characters indicate corresponding parts throughout the several views of the drawings.

Figure 5:
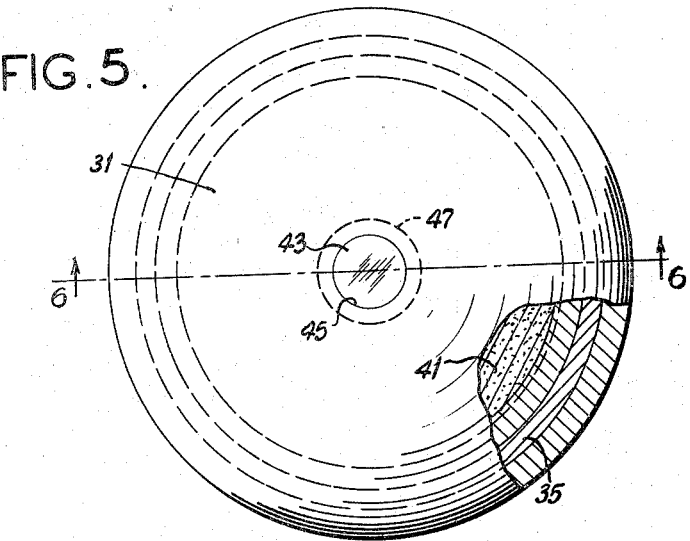
Fig. 5 is a plan view, partly broken away and shown in section, of another form of flower holder of this invention.

Referring to Figs. 1–3 of the drawings, a flower holder of my invention is shown to comprise a closed container 1 made of thin sections or panels (in the range of ¼ to ¾ of an inch thick) of a rigid multicellular, closed-cell material having frangible cell walls, and thereby capable of being easily pierced by the stems of cut flowers, and containing a granular, water absorbent filler material 13 (to be more particularly described) which is also easily pierced by flower stems and yet is capable of providing very adequate supplementary support for the flowers so pierced through the container and into it. A suitable multicellular material is an aerated, lightweight, closed-cell frangible polystyrene plastic sold under the trade names Styrofoam or Floralfoam. Thin sections of the Styrofoam would not serve well for this purpose without the material 13, since flowers pierced through them would in effect be upon fulcrum-type bearings and in most instances would not stay as positioned by the florist; however, in combination with the material 13, many novel results are achieved. As shown in Figs. 1–3 I have made the container 1 in the form of a rectangular block of six panels of the multicellular material—a bottom panel 3, two side panels 5, two end panels 7, and a top panel 9. The panels are secured together by means of an adhesive or mastic which is insoluble in water or flower-preserving solutions as indicated at 11 and which does not liquefy or soften, preferably up to about 175° F.

For some years florists have used solid pieces of various shapes and thicknesses of Styrofoam, usually on the order of 1½ to 3 inches in thickness, as flower arranging bases; however, flowers used in conjunction with such blocks must be reinforced or supported by being wired or tied to sticks (sometimes called "picks") and the sticks then inserted into the blocks. Also, metal picks, or wires, or various combinations of similar supporting accessories are used for the same purpose by some florists. When Styrofoam is penetrated by a stem or other object, the aerated or foamed cells in the line of penetration are driven ahead of the penetrating element and a local densification occurs, penetration becomes progressively more difficult and, unless clearance is provided for the densified portion, flower stems almost invariably break, thus explaining the generally acknowledged necessity for the various reinforcing materials for flowers to be used in conjunction with solid blocks. Lateral compression of Styrofoam cells is created by the tapered sticks so used and this holds the sticks in place, but actual support of a reinforced flower stem which might be thought to result from the stem's own partial penetration (if any) into the block is practically negligible. Thin Styrofoam sections such as comprise the walls of the flower holder of the present invention provide clearance for the locally densified portion (plugs) of the foam, as such plugs may easily be driven right through the wall and into the container, resulting in easy penetration by the flowers without wires, picks, or sticks—even if the flower stems are not tapered. Tapering the stems, i.e., cutting to the desired length on a bias such as is customary even when arranging flowers in water to increase their ability to draw the liquid, is also beneficial to flowers pierced into holders of the present invention and for the same reason. Also, there is much less likelihood of creating and driving a plug or piece of Styrofoam ahead of the flower stem into the filler. The lateral forces created by piercing a thin section of Styrofoam with a tapered stem compress some and rupture others of the hundreds of cells surrounding it, thus creating a multiplicity of tiny, sharp, rigid edges which tend to hug the flower and thus enhance its firm, longitudinal-holding capacity, to prevent flowers from falling out of the precise positions in which they were arranged, even during rough delivery or shipping.

It should also be noted that the flower holder of the present invention does not require enveloping in foil or other puncturable wrappers and subsequently binding as with string or wire to prevent fractures which may occur when several penetrating objects closely approach a common point within a solid block of Styrofoam, since the granular filler material 13 conveniently moves to the extent that such stems which might collide or intermingle tend to reinforce the entire structure instead of destroy it as in the case of the solid block.

From the foregoing it will be seen that the flower holder of the present invention saves preparation time and accessory expenses for the florist and that the method of construction diminishes the chance of breakage at inopportune times, such as during funeral rites, etc.

It is contemplated that the present invention's case or shell be made of Styrofoam or urethane foam of a density of 1.5 to 2 pounds per cubic foot, except for the bottom panel. The bottom panel is made of denser Styrofoam, to prevent flowers which have been pierced through the shell and into the material 13 from going out into the air again through the bottom. A denser material, either Styrofoam or other foamed resinous products, in the range of 3- to 6-pounds-per-cubic-foot density, serves well for this preventive purpose. In addition, when used for funeral sprays, these denser bottom materials may be impaled upon the spikes of undertakers' flower display racks without danger of falling off or fracturing. Prior-art spray plaques are sometimes equipped with special slots or metal hanging straps to accommodate the rack spikes, but it is obvious here that such special additional features are not needed in the holder of the present invention.

Within the multicellular rigid container, I provide the granular, water-absorbent inert filler material 13, preferably commercial expanded aluminum silicate to be more particularly described, and hereinafter referred to as the filler. This filler is adapted to rapidly absorb and hold water, but it does not leak or drain even when being penetrated by the stems of flowers pierced through the walls of the container, and forms a flexible base or bed for the precise arrangement of the flowers. The filler 13 is adapted to be moistened with water, containing a nutrient for the flowers, if desired, or it may be blended or mixed with dry nutrients before placing in the container, so that when water is added the nutrients will go into solution. The water or nutrient solution is drawn through the stems of the flowers by their natural transpiration and greatly prolongs the life of and enhances the beauty of the flowers.

The filler may be packed in the container prior to adhering the last wall section in place, such as the top; or, alternatively, it may be fed through a hole by any of several mechanical means and the hole subsequently closed by a plug of similar or dissimilar material.

It will be understood that the container 1, being made of closed-cell material, is watertight. To moisten the filler with water, the plug 15 may be removed and a measured amount of water, adequate to nearly saturate the filler, is poured in through the opening. By using a plug of dissimilar material or color from that of the closed-cell material of the container, as mentioned above, the user's attention is attracted to the plug which may carry instructions as to the amount of water to be used, etc. After the water has been poured in, the opening is preferably reclosed by the plug to diminish possible evaporation.

Instead of having the plug 15 pre-cut, the filler may be packed in the container prior to securing one of the panels to the remainder. For example, panels 3, 5 and 7 may be secured together, the dry filler packed in the resultant open box, and then panel 9 applied to complete the closed container. In this case, the user will cut a tapered plug from one wall of the container, remove the plug, pour in the water, and replace the plug. If a small hole is cut, reclosure of the hole may not be necessary because the filler readily takes up the measured amount of water, and leakage cannot occur unless the shell is accidentally crushed and the filler consequently rather heavily compressed. I have placed weights of 180 pounds on such containers only 7 x 4 x 2¾ inches without breakage.

With the filler 13 adequately moistened with water or nutrient solutions, the flower holder is adaptable to be used in making up a floral arrangement for any purpose by merely inserting the ends of the stems of the cut flowers through any of the container walls and into the filler according to the arrangement desired by the florist. The flowers in the holder may have their lives extended by periodically adding water to the filler through an opening in its top to replace moisture taken up by the flowers; however, this should rarely be necessary because of the substantial water-suspending capacity of the specially selected aluminum silicate filler and its peculiar characteristic of readily releasing water in response to the transpiration of flowers, but without leaking at all even under the lateral stresses encountered in supporting flowers or the longitudinal forces involved in the inserting of stems, etc.

It will be seen that the completely closed, single-walled, easily penetrated, leakproof flower holder of the present invention provides the user with a complete freedom of design and rapidity, ease, and economy of use heretofore unobtainable. Further, the holder of the present invention can be made in any desired form and used for virtually any of the requirements of the trade, including large or small, portable, horizontally or vertically standing, or hanging holders for weddings, hospital containers, table centerpieces, sprays, myriads of designs, or even spheres or inverted decorations for ceilings. Any of these items can be held in the positions mentioned without loss of water or filler, and each flower will retain its precise original position. A further advantage of the present invention's completely closed container is that it holds the powdered filler without the loss of powder, either wet or dry. It will be readily seen that the many novel features of the present invention provide a freedom of design and versatility, combined with a speed and ease of use, cleanliness and absence of leaks heretofore unobtainable.

For the filler material 13, I have found that any inert filler material having a mean particle size between approximately 0.002 and 0.04 in. and an interconnected porosity between approximately 33% and 75% of the total volume is suitable for use in the invention. Inert filler materials having these properties are adapted to hold water for supplying moisture to the stems of flowers pierced through the multicellular material of the container and are capable of being penetrated by the stems of flowers pierced through the multicellular material to form a flexible base or bed for precisely arranging the flowers. Various inert filler materials having the properties specified above have been employed. For example, I have used glass beads falling within a specific grain size range to be more particularly described hereafter, and thus being capable of holding a considerable quantity of water and which are fairly well adapted to serve as a flexible base or bed for the reception of the stems of flowers pierced through the multicellular material of the container. Other inert filler materials which may be used include various grades of perlite such as those sold under the trade designations "Talcite" (marketed by International Minerals & Chemical Corp.), "Socorro," and "Alexite" (marketed by Great Lakes Carbon Corp.), vermiculite such as that sold under the trade designation "Zonolite" (marketed by Western Mineral Products Co.) and oil well sand such as that marketed by Halliburton Oil Well Cementing Co., each of these filler materials having the properties specified above.

The following tests were conducted in determining the suitability of various inert fillers for use in the practice of the invention. The following materials were employed:

TABLE I

| Sample No: | Identification |
|---|---|
| 1 | Talcite A. |
| 2 | Talcite B. |
| 3 | Socorro Perlite. |
| 4 | Silbrico Perlite. |
| 5 | Plaster aggregate (commercial). |
| 6 | Dicalite 4200 (coarset diatomaceous earth). |
| 7 | Talcite B, +50 mesh screen. |
| 8 | Talcite B, −50 mesh screen. |
| 9 | Talcite A, +50 mesh screen. |
| 10 | Talcite A, −50 mesh screen. |

Sources

Nos. 1, 2, 7, 8, 9, 10 _____ International Minerals and Chemical Corp.
Nos. 3, 4, 5, 6 _____ Great Lakes Carbon Corp.

The materials were subjected to particle size analysis on Tyler Standard Screens, using a ROTO-TAP Testing Sieve Shaker for five minutes. The results are set forth in the following table:

TABLE II
*Particle size analysis*

| Sample No. | | 1 | 2 | 3 | 4 | 5 | 6 | 7 | 8 | 9 | 10 |
|---|---|---|---|---|---|---|---|---|---|---|---|
| Mesh Size | Opening (inches) | (Shown in Percent Retained On) | | | | | | | | | |
| +28 | .0232 | 12 | 10 | 14 | 44 | 68 | 0 | 26 | 0 | 24 | 0 |
| +35 | .0164 | 28 | 30 | 26 | 54 | 78 | 0 | 64 | 0 | 56 | 0 |
| +48 | .0116 | 50 | 50 | 46 | 62 | 84 | .5 | 96 | 0 | 88 | 0 |
| +65 | .0082 | 66 | 72 | 68 | 72 | 92 | 1.0 | 100 | 48 | 98 | 40 |
| +100 | .0058 | 80 | 80 | 80 | 78 | 94 | 2.5 | 0 | 64 | 100 | 54 |
| +150 | .0041 | 88 | 88 | 90 | 88 | 96 | 8.0 | 0 | 80 | 0 | 70 |
| +200 | .0029 | 94 | 92 | 94 | 92 | 98 | 15.0 | 0 | 86 | 0 | 84 |
| −200 | | 6 | 8 | 6 | 8 | 2 | 85.0 | 0 | 14 | 0 | 16 |
| Mean Particle Size (in.) | | .012 | .012 | .011 | .018 | ¹.038 | ¹.001 | .017 | .008 | .018 | .007 |
| Inter-Quartile Range | | .010 | .012 | .010 | .017 | ¹.043 | ¹.001 | .008 | .005 | .009 | .006 |

¹ Extrapolated results.

In the above table, the mean particle size is the particle size (inches) that 50% of the particles (by weight) are larger than, e.g., 50th percentile. The inter-quartile range is the 25th percentile minus the 75th percentile, and indicates the spread of the particle size distribution.

The bulk density of each of the materials listed above was determined by adding a weighed amount (20 grams) of material to a 300 ml. section of a 1000 ml. calibrated cylinder. The cylinder was tamped 20 times by allowing it to drop approximately 1 inch onto a rubber stopper. A reading of the volume of material in the cylinder was then taken and the bulk density was calculated as follows:

$$\text{Bulk density (lbs./ft.}^3) = \frac{(62.4)(\text{weight in grams})}{\text{volume in ml.}}$$

The interconnected porosity of each of the materials listed above was determined by adding a measured amount of water to the tamped volume of material employed for the bulk density test, the water being added until all voids small enough to support a water column were full. The interconnected porosity was then calculated as follows:

Interconnected porosity (percent)
$$= \frac{\text{Vol. of retained water (ml.)} \times 100}{\text{vol. of material (ml.)}}$$

The total porosity of each of the materials listed above was calculated from the bulk densities of the materials. Total porosity includes all interconnected voids, sealed voids, and those voids too large to support a water column.

Total porosity percent
$$= \left[1 - \frac{\text{Bulk Density}\left(\frac{\text{Grams}}{\text{ml.}}\right)}{\text{Specific Gravity}}\right][100]$$

The specific gravity for each of the materials tested was 2.35.

The water loss was determined for each of the materials tested by first filling a 300 ml. beaker and tamping the material to the 200 ml. mark. Water (120 ml.) was then added to the beaker. Thirteen ¼″ x 4″ dowel pins were inserted into the material to the bottom of the beaker. The dowel pins occupied approximately 15% of the material volume. The beaker was then turned upside down and allowed to drain for five minutes. The amount of water which drained during this period was recorded as the water loss.

The results of the above tests and calculations are set forth in the following table:

TABLE III

| Sample No. | Bulk Density (lbs./ft.³) | Inter-connected Porosity (percent) | Total Porosity (percent) | Water Loss (ml.) |
|---|---|---|---|---|
| 1 | 3.7 | 64 | 97.5 | 2.0 |
| 2 | 6.7 | 62 | 95.5 | 2.5 |
| 3 | 3.7 | 61 | 97.5 | 3.0 |
| 4 | 3.0 | 66 | 98.0 | 3.0 |
| 5 | 6.5 | 55 | 95.5 | 12.0 |
| 6 | 21.8 | 75 | 85.0 | 0 |
| 7 | 3.1 | 56 | 98.0 | 8.0 |
| 8 | 5.9 | 67 | 96.0 | 1.0 |
| 9 | 3.5 | 58 | 97.5 | 5.0 |
| 10 | 4.5 | 66 | 97.0 | 0.5 |

From the above, it has been found that any inert filler material having a mean particle size between approximately 0.002 and 0.04 in. and an interconnected porosity between approximately 33% and 75% of the total volume may be used in the practice of the invention. The preferred mean particle size for the inert filler material is 0.010 in. and the preferred interconnected porosity is 64% of the total volume. Also, it is preferred that the inert filler material 13 have an inter-quartile range not in excess of 0.017 in., a bulk density (lbs./ft.³) between 3.75 and 60, preferably 4.5, and a total porosity between 40% and 97%. Further, it is desirable and preferred that the filler material be frangible.

As mentioned above, mean particle size and interconnected porosity are the two most important properties exhibited by the filler materials of the invention. Water filling speed is directly proportional to particle size. Water holding capacity is a function of particle size and is inversely proportional to particle size. Further, it has been found that water holding capacity is directly proportional to interconnected porosity at a constant mean particle size. The limits set forth above have been found to be the practical operating limits for inert filler materials useful in the practice of the invention. The plaster aggregate, sample 5, loses water, and it is nearly impossible to penetrate with flower stems. Also unsatisfactory is diatomaceous earth, sample 6, which is on the opposite end of the mean particle-size scale and after a few hours sets up in an impenetrable cake with a layer of water on top. It can be readily seen that grain sizes and interconnected porosities are critical in the performance of the flower holders of this invention.

The preferred inert filler material 13 is commercial expanded aluminum silicate, sometimes called perlite, having the properties set out above. This material is of mineral origin and is commercially available in various grades and sizes, the ores being designated typically as onion skin, granular and pumaceous, the latter being preferred for the present invention. The ore when crushed and sized and heated in air to form partially sealed and partially cracked cellular structures of particle sizes within the range mentioned above is capable of holding on the order of 56% by volume of water even under vibration, an amount usually equal to 6 times its own weight. Moreover, it rapidly absorbs and adsorbs water poured into it and reaches a suitably constant aqueous equillibrium or suspension without shaking or stirring, and in this condition it feels almost dry. For example, a volume of 21 quarts of said material received and held 12 quarts of water in two minutes. Some expanding of a packed mass of grains may result from wetting. When loose-filled, the material undergoes some shrinkage due to release of entrapped air when the water is added, and it does not shrink perceptibly thereafter during wet storage. When dried it has substantially the same appearance as prior to wetting. Under static conditions, small quantities, such as one cup, will hold up to 67% by volume of water so it is readily understood why the desirable degree of moistening (approximately 56%) specified here constitutes a truly leakproof filler.

Moreover, very soon after the addition of water the perlite filler is ready for use as a flexible base or bedding material for the support of cut flowers. If desired, it may be stored indefinitely prior to use, since bacteria do not seem to grow in it. Properly moistened, the perlite filler does not leak or exude water, and penetration of the stems of either small or large flowers is readily accomplished. Further, since the perlite filler has no particular direction of grain, its water content is evenly and quickly distributed throughout the mass and, after the insertion of flowers, the water is gradually drawn into the stems from the entire mass by capillary action in response to transpiration of the flowers. Transpiration in flowers involves intake of water through the ends (mostly) of the stems and exhalation of moisture and gases through foliage and blossoms exposed to the atmosphere. Prior-art bedding materials composed of water-absorbent bricks of aerated or foamed plastics, such as urea formaldehyde resin foam, contain numerous water barriers (which necessitate that the brick be repeatedly compressed and released under water for a period of minutes to saturate), and consequently do not release to the flowers so great a proportion of their water content as does the inert filler of this invention. Phenol formaldehyde resin foam, while it does not require compression and release to obtain moisture, must be submerged for 2 to 5 minutes and allowed to soak from 30 to 45 minutes to obtain suitable saturation, this apparently resulting from a stratified or piped cellular structure which appears to inhibit the release of moisture somewhat as in the case of other sponge material. In addition, such foamed bricks or pieces of material, when pierced by flower stems, lose the cubic volume of the water holding capillary areas actually crushed by the entry of the stems. The perlite filler of this invention remains relatively uninjured by the insertion of stems, since its grains apparently rearrange to accommodate them.

Gelling agents, such as gums, resins or bentonite, may also be added to the inert filler materials of the invention to increase the stability of the water absorbed; however, since such substances tend to impede the flow of water into the mass and since they may tend to hold water from the flowers, it is preferred that only small quantities should be included, if any. Wetting agents adversely affect the desirable properties of water surface tension in combination with the expanded aluminum silicate or other inert filler materials, since the surface tension of the water is reduced by the wetting agents and water-suspending capacity correspondingly drops.

Bactericides of varieties which are nontoxic to flowers may be added to the inert filler material 13, but I have largely discontinued this practice because bacteria appear to make little growth, if any, in the inorganic material. Even flowers like stocks which ordinarily generate a strong odor in water do not generate an odor in the wet fillers. Perlite, the preferred inert filler material, is also non-staining to clothing or the like and, after being allowed to dry, is merely brushed off such fabrics. Also, most of the particles of the filler material float and are noncorrosive and may be washed down conventional drain pipes without deleterious effect.

A spectroanalysis of two suitable commercial expanded aluminum silicates which include the relatively minor amounts of compounds or elements incurred in the natural state and which do not require removal for the purposes of this invention is as follows, per specifications from the manufacturer:

| Composition | "Socorro", (New Mexico Ore) | "Alexite", (Colorado Ore) |
|---|---|---|
| | Percent | Percent |
| $SiO_2$ | 73.50 | 73.16 |
| $Al_2O_3$ | 17.40 | 18.00 |
| $Fe_2O_3$ | .70 | 1.00 |
| MgO | .06 | .09 |
| $V_2O_5$ | .003 | .003 |
| CaO | .49 | .38 |
| $TiO_2$ | .27 | .32 |
| CuO | .003 | .0026 |
| $Na_2O$ | 1.92 | 1.70 |
| MnO | 0.12 | 0.24 |
| $K_2O$ | 5.37 | 5.10 |

It is understood that the possibility of aqueous leakage is progressively diminished by natural floral transpiration; however, the properly moistened perlite filler will not leak water along stems or accessories or through the Styrofoam walls at any time. Excessive watering of the filler should be avoided.

Figure 6:
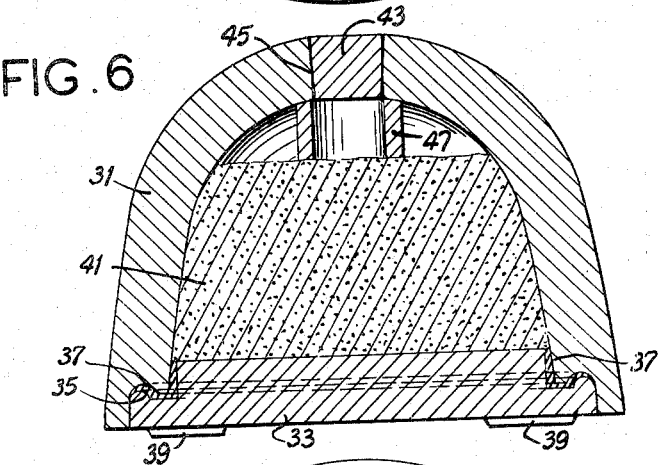
Fig. 6 is a section taken on line 6—6 of Fig. 5.
Figure 7:
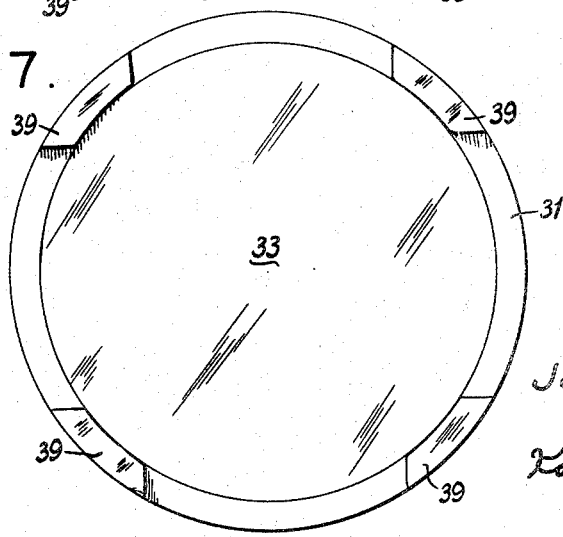
Fig. 7 is a bottom plan of the Fig. 5 holder.

Figs. 5–7 show another form of flower holder of this invention comprising a dome-shaped body 31 made of a rigid, multicellular, closed-cell material such as Styrofoam and having a base made of a similar or dissimilar material closing the bottom of the dome. The dome 31 and base 33 are matched with a watertight joint of tongue-and-groove construction as indicated at 35 with wax 37 or other suitable mastic sealing material bonding the parts together and making the joint watertight. The dome is formed to provide feet 39 so that, when the holder is placed on a table or the like, air may pass beneath the holder to obviate condensation. The feet may be provided on the base instead of the dome. In the container is a filler 41, preferably the inert filler of this invention. A slightly tapered hole 45 may be cut in the top of the dome to be used for addition of water to the filler; however, a counterbored hole is preferred. A removable plug 43, similarly tapered would be furnished in situ for a closure, or a disc in the case of a counterbored hole. A tube 47, preferably made of Styrofoam, is secured as by adhesive to extend down from the top of the dome in line with the filler hole 45. To suitably moisten the filler, the plug 43 is taken out and water poured into the hole 45. The tube 47 prevents excessive moistening of the filler with water, because the water entraps air in the space around the tube to prevent entry of water above the bottom of the tube. After so moistening the filler, the plug 43 may be replaced and then flower stems may be pushed through any dome area in the same manner described for the holder 1. Stems may be pushed through either type of plug without pushing the plug down into the filler material. In centerpiece arrangements, a "taper" candle may be placed in the hole creating a novel effect, yet without interfering with the internal arranging space.

Since the inert filler material of the present invention is preferably frangible, the flower holders of the invention as shown in Figs. 2, 3, 4 and 6 may be filled to the top thereof with filler material, if desired, and used satisfactorily as described above.

The inert perlite filler material of the invention inhibits the growth of bacteria even upon organic materials inserted into it. I have used perlite for as long as six weeks in the same holder of this invention with several normal changes of bouquets, and I have found no odors present either in the filler or upon the stems of the flowers which had been used in it. So-called flat ferns, pine foliage, and a number of other organic fillers commonly used in vases and bowls deteriorate rapidly in water and breed strong odors. Such organic fillers or the wettable foam plastics or water drained from them can stain fabrics, but the perlite filler of this invention is nonstaining to fabrics and is easily removed when dry by brushing or when wet by simple rinsing.

It is, of course, practical to color the material during manufacture by blending small percentages of various chemicals with the ore prior to expanding. Since such colors are usually insoluble or only slightly soluble oxides, there is considerably less chance of staining fabrics in the event of accident than would be the case where solutions of color were prepared and added. Greens, grays, reds, and browns are a few of the colors which have been so prepared during the expanding process to create a colored filler.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A flower holder comprising a closed container having a wall made of a substantially rigid multicellular closed-cell material having frangible cell walls and thereby capable of being pierced by the stems of cut flowers and adapted to support the flowers in a desired arrangement, and a filler in the container adapted to hold water for supplying moisture to the stems of flowers pierced through the multicellular material and capable of being penetrated by the stems of flowers pierced through the multicellular material to form a bed for additionally supporting the flowers.

2. A flower holder comprising a closed container having a wall made of a substantially rigid aerated lightweight multicellular closed-cell polystyrene plastic having frangible cell walls and thereby capable of being pierced by the stems of cut flowers and adapted to support the flowers in a desired arrangement, and a filler in the container adapted to hold water for supplying moisture to the stems of flowers pierced through the plastic and capable of being penetrated by the stems of flowers pierced through the plastic to form a bed for additionally supporting the flowers.

3. A flower holder comprising a closed container having a wall made of a substantially rigid multicellular closed-cell material having frangible cell walls and thereby capable of being pierced by the stems of cut flowers and adapted to support the flowers in a desired arrangement, and an inert filler material in the container adapted to hold water for supplying moisture to the stems of flowers pierced through the wall and capable of being penetrated by the stems of flowers pierced through the wall to form a bed for additionally supporting the flowers, said inert filler material having a mean particle size between approximately 0.002 in. and approximately 0.040 in. and an interconnected porosity between approximately 33% and approximately 75% of the total volume of the filler material.

4. A flower holder comprising a closed container made of a substantially rigid multicellular closed-cell material having frangible cell walls and thereby capable of being pierced by the stems of cut flowers and adapted to support the flowers in a desired arrangement, and a filler in the container adapted to hold water for supplying moisture to the stems of flowers pierced through the multicellular material and capable of being penetrated by the stems of flowers pierced through the multicellular material to form a bed for additionally supporting the flowers, the container having a hole in the top closed by a removable plug, and a tube extending down from the top of the container in line with the hole.

5. A flower holder as set forth in claim 4, said tube being made of a substantially rigid multicellular closed-cell material having frangible cell walls and capable of being pierced by the stems of cut flowers.

6. A flower holder comprising a closed container all the walls of which except the bottom are made of a substantially rigid multicellular closed-cell material having frangible cell walls and thereby capable of being pierced by the stems of cut flowers and adapted to support the flowers in a desired arrangement, and having a bottom of material substantially impenetrable by the stems of flowers, and a filler in the container adapted to hold water for supplying moisture to the stems of flowers pierced through the multicellular material and capable of being penetrated by the stems of flowers pierced through the multicellular material to form a bed for additionally supporting the flowers.

7. A flower holder as set forth in claim 6 wherein the bottom is made of a rigid multicellular closed-cell material which is denser than the material of the walls of the container.

References Cited in the file of this patent

UNITED STATES PATENTS

| | | |
|---|---|---|
| 451,645 | Tudor | May 5, 1891 |
| 847,749 | Ellis | Mar. 19, 1907 |
| 1,231,975 | Weitzel | July 3, 1917 |
| 2,113,523 | White | Apr. 5, 1938 |
| 2,416,136 | Arlington | Feb. 18, 1947 |
| 2,486,512 | Armstrong | Nov. 1, 1949 |
| 2,602,782 | Zoradi | July 8, 1952 |
| 2,618,901 | Braun | Nov. 25, 1952 |
| 2,645,872 | Melander | July 21, 1953 |

OTHER REFERENCES

Publications: Bureau of Mines Information Circular, August 1946, entitled "Perlite Source of Synthetic Pumice." Pages 1–11. By Oliver C. Ralston.

Popular Science, "Greenhouse Plants Grown and Transplanted in Plastic Bags." Vol. 158, No. 5, May 1951, page 98.

UNITED STATES PATENT OFFICE

CERTIFICATE OF CORRECTION

Patent No. 2,904,933 September 22, 1959

James M. King

It is hereby certified that error appears in the printed specification of the above numbered patent requiring correction and that the said Letters Patent should read as corrected below.

Column 4, line 70, for "coarset" read -- coarsest --; column 7, line 69, for "absorbed" read -- adsorbed --.

Signed and sealed this 22nd day of March 1960.

(SEAL)
Attest:

KARL H. AXLINE
Attesting Officer

ROBERT C. WATSON
Commissioner of Patents